(12) United States Patent
Lønborg et al.

(10) Patent No.: US 10,257,052 B1
(45) Date of Patent: Apr. 9, 2019

(54) COMPUTER-IMPLEMENTED METHOD PERFORMED BY AN ELECTRONIC DATA PROCESSING APPARATUS TO MORE EFFICIENTLY UTILIZE NETWORK RESOURCES FOR AT LEAST ONE USER DEVICE AND DATA PROCESSING APPARATUS FOR THE SAME

(71) Applicant: Heart Thinking Technologies GmbH, Wetzikon (CH)

(72) Inventors: Søren Lønborg, Wetzikon (CH); Nick Michael Brincker, Rüfenacht (CH)

(73) Assignee: Heart Thinking Technologies GmbH, Wetzikon (CH)

( * ) Notice: Subject to any disclaimer, the term of this patent is extended or adjusted under 35 U.S.C. 154(b) by 0 days.

(21) Appl. No.: 15/908,110

(22) Filed: Feb. 28, 2018

(51) Int. Cl.
*H04L 29/06* (2006.01)
*H04L 29/08* (2006.01)
(Continued)

(52) U.S. Cl.
CPC .......... *H04L 41/50* (2013.01); *H04L 43/0876* (2013.01)

(58) Field of Classification Search
CPC ............................ H04L 41/50; H04L 43/0876
(Continued)

(56) References Cited

U.S. PATENT DOCUMENTS 7,296,070 B2 * 11/2007 Sweeney ............. G06F 11/3466
709/224
9,069,458 B2 6/2015 Brewer
(Continued)

FOREIGN PATENT DOCUMENTS

WO WO 2012/116053 A2 8/2012
WO WO 2016/210327 A1 12/2016

OTHER PUBLICATIONS

"Cisco Unified Communication Manager Restricted versus Unrestricted Software Classifications"—Cisco, Jul. 2015 https://community.cisco.conn/legacyfs/online/attachnnents/discussion/61220-cucnn_restricted_versus_unrestricted_v2.pdf.*

*Primary Examiner* — Randy A Scott
(74) *Attorney, Agent, or Firm* — Nixon Peabody LLP (57) ABSTRACT

A computer-implemented method to implement efficient utilization of network resources by an electronic data processing system to conserve network bandwidth consumed by user computing devices over a computer network by managing access to restricted and non-restricted software services. The method includes: operatively connecting the electronic data processing system to a first of the non-restricted software services via a first application programming interface (API); receiving a first topic indicative of an improvement in or a type of competency by a human user of a first of the user computing devices on which the first non-restricted software service is at least partly deployed, the first non-restricted software service having an electronic interface with which the human user interacts using the first of the user computing devices to attain or improve the competency of the human user; calculating, by the electronic data processing system, a weighted competency score based on a quantity corresponding to or representing the first topic and a weight configured to normalize the quantity relative to other non-restricted software services; and updating, by a time index calculator, a first time allowance index using the calculated weighted competency score, the first time allowance index representing a time period during which a time-limited access to a first of the restricted software services is granted by the electronic data processing system.

20 Claims, 5 Drawing Sheets

(51) Int. Cl.
*G06F 15/16* (2006.01)
*G06F 15/173* (2006.01)
*H04L 12/24* (2006.01)
*H04L 12/26* (2006.01)

(58) Field of Classification Search
USPC .... 709/217, 219, 223, 224, 225; 718/1, 104; 717/127, 128, 129; 719/310, 321
See application file for complete search history.

(56) References Cited

U.S. PATENT DOCUMENTS

| | | |
|---|---|---|
| 2004/0070604 A1 | 4/2004 | Bhat |
| 2010/0274617 A1 | 10/2010 | Suomela |
| 2010/0331147 A1 | 12/2010 | Mikan |
| 2012/0159145 A1 | 6/2012 | Cheong |
| 2013/0330694 A1 | 12/2013 | Watterson |
| 2014/0272894 A1 | 9/2014 | Grimes |
| 2015/0032887 A1* | 1/2015 | Pesek ............... G06F 21/305 709/224 |
| 2015/0243175 A1 | 8/2015 | Raman |

\* cited by examiner

COMPUTER-IMPLEMENTED METHOD PERFORMED BY AN ELECTRONIC DATA PROCESSING APPARATUS TO MORE EFFICIENTLY UTILIZE NETWORK RESOURCES FOR AT LEAST ONE USER DEVICE AND DATA PROCESSING APPARATUS FOR THE SAME

FIELD OF THE INVENTION

The present invention relates generally to efficient utilization of network resources and more particularly to a computer-implemented method performed by an electronic data processing apparatus to implement efficient utilization of network resources and conservation of network bandwidth for at least one user device. Additionally, the present invention relates to an electronic data processing apparatus implementing the utilization and conservation method.

BACKGROUND OF THE INVENTION

Management of computer network resources and bandwidth consumption across a computer network are usually based on objectively measurable or determinable factors such as overall traffic across the network, speed of the traffic, number of users consuming or pushing data on the computer network, types of communication interfaces of the computer devices attached to the network, physical characteristics of the media carrying data over the network, the number and quality of nodes from source to destination, or the economic value of the user to the computer network, for example.

However, there is still a need for new network resource management systems and methods.

SUMMARY OF INVENTION

As mentioned, management of computer network resources and bandwidth consumption across a computer network are usually based on objectively measurable or determinable factors. However, according to aspects of the present disclosure, new network resource management systems and methods are proposed. Instead of using conventional factors or criteria to manage network resources and bandwidth consumption, the present disclosure exploits actual human effort to master a competency, which operates as a sort of time-limited "spigot" that allows time-limited access to restricted software services on the computer network. A quantifiable improvement in a competency using a non-restricted software service must be demonstrated to an electronic data processing system to "earn" time-limited access to a restricted software service. According to an aspect, the amount of time earned for the restricted software service can be commensurate with an improvement in the competency using the non-restricted software service, and/or other criteria described herein. In other words, a qualitative effort put into a non-restricted software service is quantified and weighted to produce a commensurate amount of time to access a restricted software service on a time-limited basis. In this way, a demonstrable improvement in a human competency should typically be demonstrated to allow additional time-limited use of network resources. This ensures that humans who are productive in the real world by showing demonstrable qualitative improvements in a competency secure the privilege to access additional resources on the computer network for an amount of time that is commensurate with the amount of improvement shown.

Non-limiting examples of configurations and implementations of various aspects of the present disclosure are summarized below.

A computer-implemented method to implement efficient utilization of network resources by an electronic data processing system to conserve network bandwidth consumed by user computing devices over a computer network by managing access to restricted and non-restricted software services is disclosed. According to an aspect, the electronic data processing system is operatively connected to a first of the non-restricted software services via a first respective application programming interfaces (API). A first topic is received via the first API, which is indicative of an improvement in or a type of competency by a human user of a first of the user computing devices on which the first non-restricted software service is at least partly deployed. In this disclosure, the terms topic and competency score may be used interchangeably. Examples of topics include a number of steps physically taken, a number of pages of an electronic book turned or read, and a number of exercises completed in an educational learning program or a foreign language program. The term competency is used herein in its ordinary sense, and it may require any combination of human skill, wit, ingenuity, cunning, or physical ability, endurance, training, or dexterity to achieve competency using a software program.

The first non-restricted software service includes an electronic interface (e.g. heartbeat monitor or step counter, electronic human-machine input interface) with which the human user interacts using the first of the user computing devices to attain or improve the competency of the human user. For example, in the case of an e-reader, as the human user reads a book, the user touches an interface to turn a virtual page. In the case of a fitness tracker, as the human user takes a step, an accelerometer or similar sensor in the fitness tracker counts that a step has been taken. In the case of an educational software program, the user inputs responses using a mouse or touch-sensitive interface to complete levels or exercises. As the user reads more pages, or walks more steps, or advances in educational levels or exercise, the user attains or improves a reading competency, or a walking competency, or a language proficiency, for example.

The electronic data processing system calculates a weighted competency score based on a quantity corresponding to or representing the first topic and a weight configured to normalize the quantity relative to other non-restricted software services. The weighting is used because different topics are quantified differently, so to normalize their values so that they can be added to a time allowance index, they should be weighted differently. For example, a human user can take hundreds of steps and accumulate a high quantity of steps, but may take just as long to complete one exercise in an educational software program. The normalization ensures that a roughly commensurate amount of effort is required to earn the same amount of time in the time allowance index.

A time index calculator updates a first time allowance index using the calculated weighted competency score. For example, the value of the first time allowance index can correspond to a period of time that the human user can spend using a restricted software service. This value is derived from the calculated weighted competency score, so that a roughly commensurate amount of time and/or effort is required for a given topic relative to other topics for other non-restricted software services. The first time allowance index thus represents a time period (e.g., 10 minutes) during which a time-limited access to a first of the restricted software services is granted by the electronic data processing system.

The electronic data processing system is operatively connected to a first of the restricted software services via a second API, and grants access to the first of the restricted software services by connecting the first of the restricted software services to the first or an other of the user computing devices operated by the human user responsive to validating that the human user is operating the first or the other of the user computing devices while decreasing the first time allowance index as the first of the restricted software services is connected (and used) to the first or the other of the user computing devices. For example, if the first time allowance index has a value corresponding to 10 minutes, the electronic data processing system will grant access to a restricted software service for use by the human user for no more than 10 minutes, assuming that the human user who accumulated the time allowance index is validated as being the same user who is attempting to access the restricted software service.

When the time period expires or reaches an expiration threshold (e.g., 5 minutes remaining), the electronic data processing system terminates or denies the human user access to all of the restricted software services. When the human user accumulates more time in the time allowance index, additional access to the restricted software service is granted for the additional time. A minimum threshold can be established, such as 30 minutes, before the electronic data processing system can be configured to grant access to a restricted software service. If the user stops access to or use of the restricted software service before the time period expires (or the expiration threshold is reached), the time allowance index (at least in some embodiments) is updated to reflect the used access time.

In some aspects, the weighted competency score can be further calculated based on an age of the human user such that different weights are applied for the same topic according to different ages or age ranges of the human user. For example, younger users may advance in their exercises more slowly through an educational software program, and therefore can be given a higher weight so that their progress has a greater impact on their time allowance index. Older and/or more experienced users can be given lower weights to reflect their enhanced status.

The weight can be dynamically adjusted based on a statistical correlation between a rate of improvement of the competency and the age or age range of the human user such that the weight associated with the human user for the topic is lower compared to a corresponding weight of an other human user for the same topic having the same age or within the same age range as the human user and having a lower rate of improvement of the competency. For example, if two users about the same age show different rates of improvement, the user who shows a higher rate of improvement should receive a higher relative weight so that their rate of improvement reflects a greater amount of value added to the time allowance index. Alternately, a younger user might learn to spell more slowly than an older user might learn new capitals of countries. All else being equal, the younger user would (otherwise) accumulate time more slowly and exert more effort for a same level of improvement, so a higher weight could be applied to the younger user's quantified topics to have a greater influence on the amount of time allowance accumulated.

In an aspect, users can compare their time allowance indexes akin to a competition to see who can accumulate the most time. To do so, the time allowance indexes for users (e.g. a subset of users e.g., grouped according to age, geography, familiarity, distance, or the like) can be displayed on a video display device in sorted order (e.g., highest to lowest), which is dynamically updated as the time allowance indexes change.

The weights applied to the topics can be static or dynamic. Dynamic weights can be calculated according to a function or produced from machine learning techniques. For example, the weight can be automatically assigned according to a function that includes how much an activity or effort by the human user expended produces a commensurate improvement in the competency such that a lower weight is applied to a low-level activity or effort that produces a relatively high improvement in the competency whereas a higher weight is applied to a high-level activity or effort that produces a relatively low improvement in the competency. For example, it could require a much greater effort for an English-speaking toddler to learn Mandarin compared to a teenage user's reading a new book from a favorite series. In this case, the toddler can be dynamically assigned a higher weight for learning Mandarin, whereas the teenage user's weight can be lowered for reading the book.

Alternately, the weight can be automatically changed to incentivize a qualitative enhancement in a subsequent pursuit of the activity or a different activity in exchange for an adjustment in the time allowance index by examining historical weights applied to accumulated competency scores by the human user to determine which of the historical weights are correlated with available ones of the non-restricted software services and at least one competency objective applied by an administrator user of the electronic data processing system. For example, during summer, walking might be encouraged, so the weights assigned to walking topics can be automatically increased.

The electronic data processing system can dynamically adjust the weight based on a historical accumulation of the first time allowance index correlated to the topic relative to other topics associated with other non-restricted software services such that a lower historical accumulation causes the weight to be raised so that the weight has a higher impact on the first time allowance index for subsequent uses of the first of the non-restricted software services. For example, if reading is not responsible for enhancing time accumulation indexes, this means that users are choosing other ways to accumulate time. Thus, the electronic data processing system can automatically raise the weight for reading so that reading activities produces more time than usual.

In some aspects, users can "borrow" time from another user, but must accumulate more time allowance to pay off the "debt" before being allowed access of their own to a restricted software service. While the first human user is accessing the first of the non-restricted software services using the first or the other of the user computing devices, an input is received from the first or the other of the user computing devices indicative of a request to add more time to the first time allowance index. Then, time accrued in a second time allowance index is transferred to the first time allowance index to grant the first human user additional time corresponding to the added time to continue to access the first of the non-restricted software services for an additional amount of time corresponding to or commensurate with the added time from the second time allowance index. As mentioned above, the first human user must pay back the additional amount of time by accumulating more time allowance that is added to the second user's time allowance index before the first user is allowed to begin to accumulate time in the first user's time allowance index. Thus, after transferring time from the second time allowance index to the first time allowance index, value from the first time allowance index accrued by the first human user as the first human user accesses an associated one of the restricted software services using the first or the other of the user computing devices is added to the second time allowance index until the added time has been restored to the second time allowance index.

In still other aspects, a blockchain is provided in which users can "borrow" time from other users, and these transactions are recorded on a public ledger. The indebetted users must return the borrowed time by attaining more competency on a non-restricted software service and accumulating time that is restored to the user's time allowance index from whom the indebetted user borrowed. All of these transactions are recorded on a public ledger so that all users can see who is borrowing time. In this way, this can create a disincentive for users to be too prominent or heavy borrowers of time. For example, the time allowance index is stored as a block in a blockchain having an associated distributed ledger such that accrued time in a time allowance index in the blockchain is configured to be exchanged with other human users of the computer network operating other ones of the user computing devices and exchanges of accrued time among human users of the computer network transacted on the blockchain are reflected in the distributed ledger.

An exchange of accrued time is tracked from the time allowance index transacted on the blockchain to a second time allowance index on the blockchain associated with a second human user on the computer network and updating the distributed ledger to reflect the exchange. Responsive to the exchange and responsive to the second human user incrementing the second time allowance index, accumulated time in the second time allowance index is transferred to the time allowance index associated with the first human user until the exchange of accrued time can be settled. The distributed ledger is updated to reflect the transfer of the accumulated time from the second time allowance index to the first time allowance index. The method can further include dynamically reducing at least one weight used to calculate a weighted competency score associated with at least an associated one of the restricted software services accessed by the second human user until the exchange of accrued time has been settled on the distributed ledger.

Any time allowance index can decrease in an accelerating manner so that pauses or breaks are encouraged, e.g., when extensive bandwidth consumed (streaming movies) using a restricted software service. The decrease can be variable. For example, the decrease in the first time allowance can accelerate as uninterrupted consumption of bandwidth on the computer network using the first of the restricted software services increases or temporally continues.

Some restricted software services may have a competency-based component, which can also be tracked and used to add more time or to slow down the timer. For example, a strategy game may be considered a restricted software service, but the strategy component of the game can be used to accumulate additional time on the restricted software service, or the rate of decrease of the time allowance index can be slowed while the strategy aspects of the game are being conducted. For example, the method can include tracking a competency-based component in the first of the restricted software services while the human user is operating the first or the other of the user computing devices via the second API. A second topic is received via the second API, which indicative of an improvement in or a type of competency in the competency-based component by the human user of the first or the other of the user computing devices. The electronic data processing system calculates a second weighted competency score based on a quantity corresponding to or representing the second topic and a second weight. The time index calculator adjusts the first time allowance index using the second calculated weighted competency score so as to extend the time the human user is granted access to the first of the restricted software services. The adjusting the first time allowance index using the second calculated weighted competency score can include slowing a rate that the first time allowance index is decreased. The second API may e.g. be implemented as part of a native OS interface.

In other aspects, one user can accumulate time on another user's time allowance index. For example, the method can include receiving a second topic indicative of an improvement in or a type of competency by the human user using a second of the non-restricted software services. The electronic data processing system calculates a second weighted competency score based on a quantity corresponding to or representing the second topic and a corresponding weight configured to normalize the quantity relative to other restricted software services. The time index calculator updates a second time allowance index using the second calculated weighted competency score. The second time allowance index represents a time period during which a time-limited access to any selected one of the restricted software services is granted by the electronic data processing system. The electronic data processing system is operatively connected to the selected one of the restricted software services, and grants access to the selected one of the restricted software services by connecting the selected one of the restricted software services to a user computing device operated by a second human user while decreasing the second time allowance index.

According to another aspect, disclosed herein is an electronic data processing system comprising one or more processing units connected to an electronic memory, and one or more signal transmitter and receiver communications elements for communicating via a computer network, wherein the one or more processing units are programmed and configured to execute the computer-implemented method and embodiments thereof as disclosed herein.

It should be noted, that the restricted software service(s) and the non-restricted software service(s) are not linked or connected, i.e. a restricted software service is not linked or connected with another (one or more) restricted software service or a (one or more) non-restricted software service, and likewise, a non-restricted software service is not linked or connected with another (one or more) non-restricted software service. No information or data needs to be shared or exchanged between the respective software services to be usable according to the aspects as disclosed herein as this is handled by the electronic data processing system/computer-implemented method as disclosed herein. The respective software services (restricted and non-restricted) can just keep functioning as normal and do not need to be modified to be usable according to the aspects as disclosed herein.

A restricted software service as disclosed herein will typically involve use of network resources. In some embodiments, one or more restricted software services may not involve a use of network resources but will (also in this case) involve the use of computational resources. For such restricted software services, a demonstrable improvement in a human competency should then typically be demonstrated to allow additional time-limited use of computational resources. Generally, all restricted software services that involves a use of network resources will also involve use of computational resources.

In some embodiments, one or more aspects of the present disclosure is used as at least a part of a parental control system and/or application restricting access to one or more restricted software services.

In other aspects, the operatively connecting the electronic data processing system to a first of the restricted software services via a second API; the granting access by the electronic data processing system to the first of the restricted software services; and the terminating or denying by the electronic data processing system the access to all of the restricted software services, is implemented as part of a native OS interface.

An OS provider may e.g. provide, via a native OS interface, one or more selected from the group consisting of: user device activity (e.g. including time allowance spent from the time allowance index since last update, time spent with white list software services, etc.); user access status; user administration; whitelist administration; schedule administration; time allowance administration; etc. via the native OS interface.

An OS provider may e.g. request and obtain, via a native OS interface, one or more selected from the group consisting of: user allowance status (e.g. including remaining time allowance index, value of the time allowance index, etc.); user access status (e.g. including full access (except blacklisted software services), only whitelist software services allowed; blocked (only allowing critical predetermined software services; etc.); current user time schedule; list of whitelist software services; identification of the critical predetermined software services allowed in blocked mode; etc. via the native OS interface.

According to another aspect, an activity index or performance score is provided instead of a time allowance index. The activity index or performance score is—at least in some embodiments—derived by an electronic data processing apparatus as described herein for the time allowance index (see e.g. FIG. 4), i.e. based on one or more competency scores and data representing quantifiable improvement thereof obtained by one or more non-restricted software services. In particular (at least in some embodiments), an activity index or performance score for a particular user is calculated or updated by an index calculator (corresponding to the time index calculator disclosed herein) additionally taking data obtained from one or more user devices into account where the data represents physical activity of a user (or is data derived therefrom) that may be provided by one or more user devices and/or by one or more external devices (see e.g. 220, 220' in FIG. 2) as disclosed herein.

However, rather than being used to restrict access to one or more restricted software service, the activity index or performance score according to this aspect and embodiments thereof is used so users can compare their respective activity index or performance score akin to a competition to see who can accumulate the highest score. To do so, activity index or performance score for users (e.g. a subset of users e.g., grouped according to age, geography, familiarity, distance, or the like) can be displayed on a video display device in sorted order (e.g., highest to lowest), which is dynamically updated as the activity indexes or performance scores change. This will still increase the likelihood of users using software services less thereby reducing network and/or computational resources and bandwidth consumption. According to this aspect (at least for some embodiments), the activity index or performance score may also be calculated taking (e.g. weighted) data into account that represent non-use or absence of use of one or more user devices for a given user. This data may e.g. be user-initiated e.g. by the user activating pause or non-use of the user device(s) (which may automatically restrict use of the user device potentially except for certain critical uses) and/or the data may e.g. be provided by the electronic data processing apparatus registering in-activity or non-use of one or more user devices of the user in a suitable way.

According to this aspect is provided a computer-implemented method to implement efficient utilization of network resources by an electronic data processing system to conserve network bandwidth consumed by user computing devices over a computer network is disclosed. According to this aspect, the electronic data processing system is operatively connected to a first of a non-restricted software services via a first respective application programming interfaces (API) and is configured to receive, via the first API, a first topic indicative of an improvement in or a type of competency by a human user of a first of the user computing devices on which the first non-restricted software service is at least partly deployed, the first non-restricted software service having an electronic interface with which the human user interacts using the first of the user computing devices to attain or improve the competency of the human user. The electronic data processing system calculates a weighted competency score based on a quantity corresponding to or representing the first topic and a weight configured to normalize the quantity relative to other non-restricted software services. An index calculator updates a first activity index or performance score using the calculated weighted competency score.

Further details and embodiments are disclosed in the following.

Definitions

All headings and sub-headings are used herein for convenience only and should not be constructed as limiting the invention in any way.

The use of any and all examples, or exemplary language provided herein, is intended merely to better illuminate the invention and does not pose a limitation on the scope of the invention unless otherwise claimed. No language in the specification should be construed as indicating any non-claimed element as essential to the practice of the invention.

This invention includes all modifications and equivalents of the subject matter recited in the claims appended hereto as permitted by applicable law.

DETAILED DESCRIPTION OF THE INVENTION

Various aspects and embodiments of a computer-implemented method performed by an electronic data processing apparatus to implement efficient utilization of network resources and conservation of network bandwidth as disclosed herein will now be described with reference to the figures.

When/if relative expressions such as "upper" and "lower", "right" and "left", "horizontal" and "vertical", "clockwise" and "counter clockwise" or similar are used in the following terms, these refer to the appended figures and not necessarily to an actual situation of use. The shown figures are schematic representations for which reason the configuration of the different structures as well as their relative dimensions are intended to serve illustrative purposes only.

Some of the different components are only disclosed in relation to a single embodiment of the invention, but is meant to be included in the other embodiments without further explanation.

Figure 1:
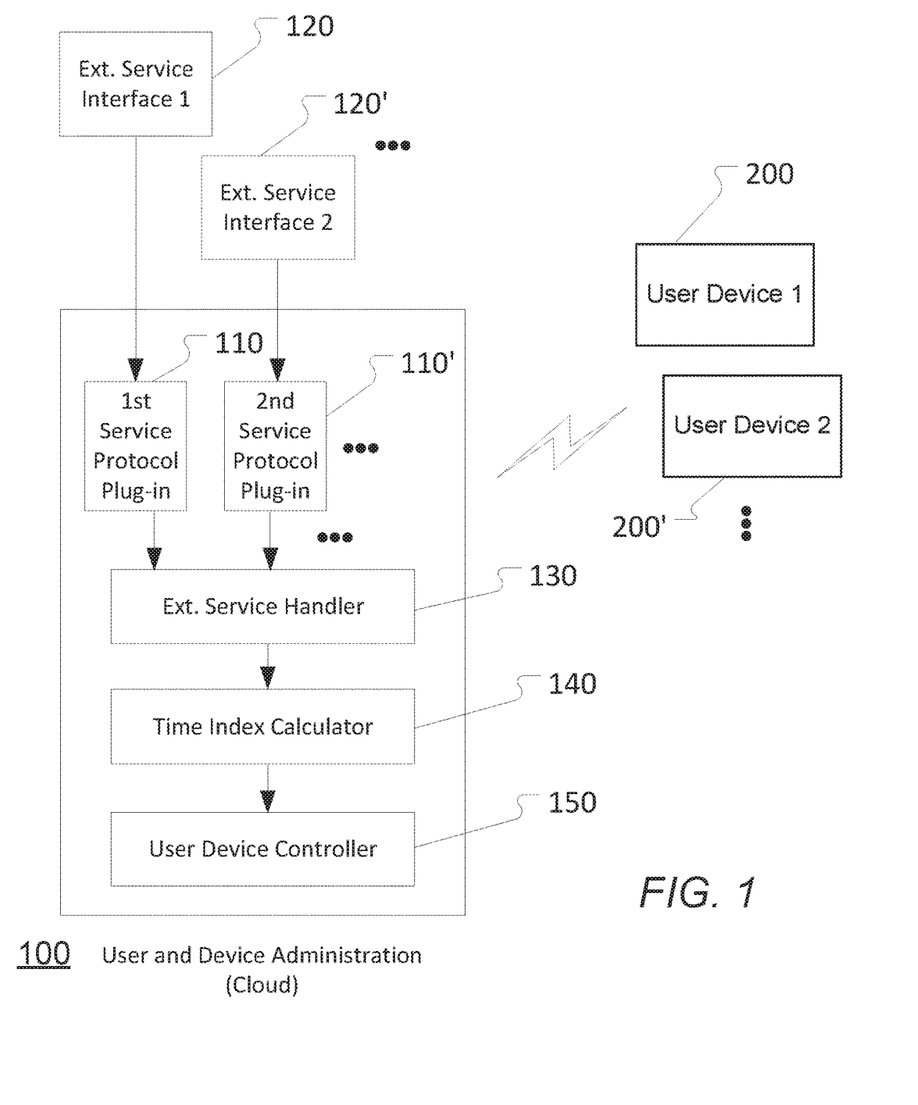
FIG. 1 schematically illustrates a block diagram of an embodiment of an electronic data processing apparatus configured to efficiently utilize network resources and to conserve network bandwidth.

FIG. 1 schematically illustrates a block diagram of an embodiment of an electronic data processing apparatus configured to efficiently utilize network resources and to conserve network bandwidth.

Figure 2:
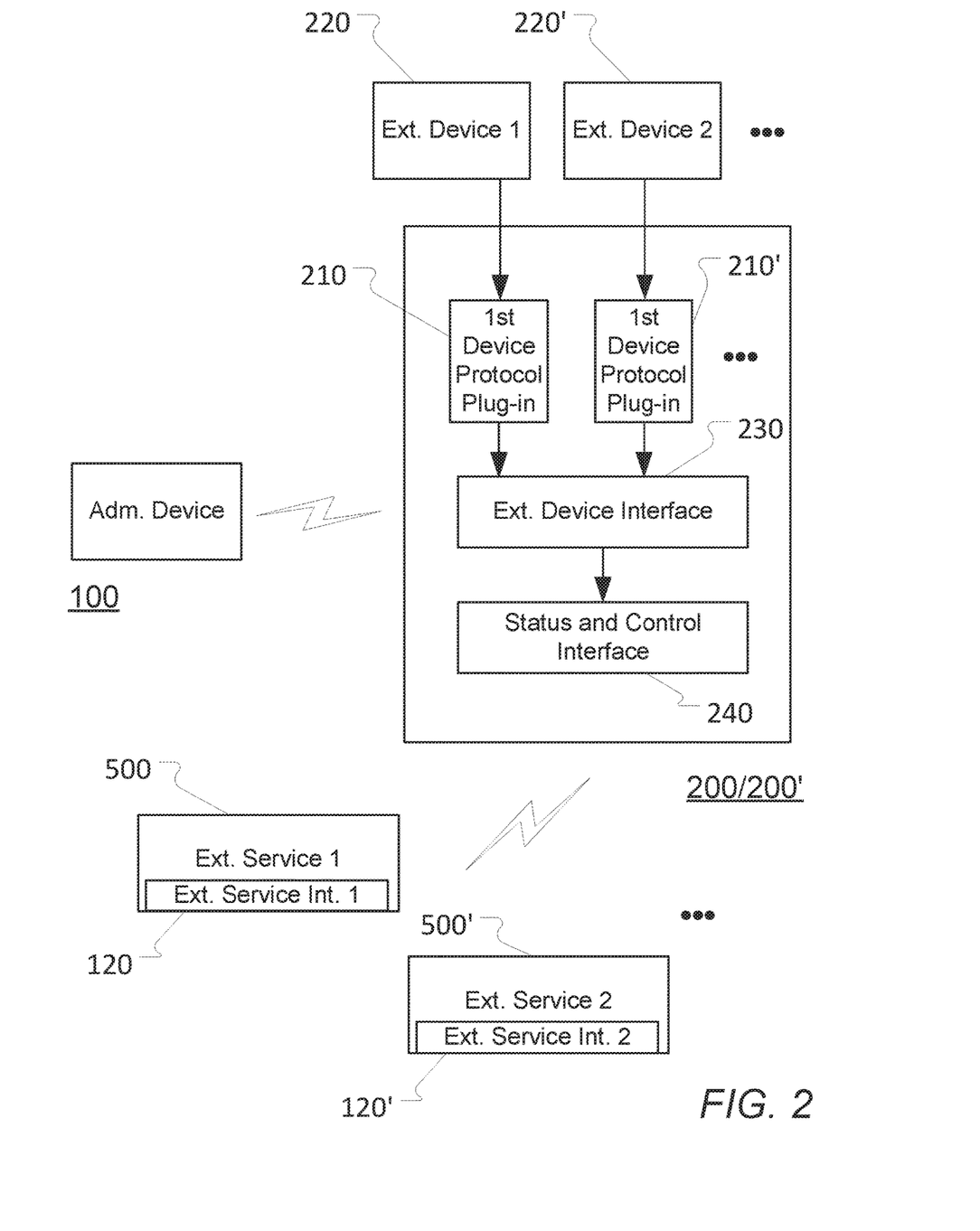
FIG. 2 schematically illustrates a block diagram of an embodiment of a user device being under control by an electronic data processing apparatus such as the one shown in FIG. 1.

Illustrated are an electronic data processing apparatus 100, one or more external service interfaces 120, 120', and one or more user devices 200, 200' (embodiments of which are illustrated in more detail in FIG. 2). A user device 200 may e.g. be shared by a plurality of users and one user may e.g. use a plurality of user devices 200. Different user devices (also for a same user) may run different operating systems.

The electronic data processing apparatus 100 comprises a standardized external service handler 130 or the like that interfaces the electronic data processing apparatus 100 with one or more external services (see e.g. 500, 500' in FIG. 2). The external service handler 130 comprises or is in connection with at least one service protocol plugin 110, 110' (e.g. also comprised by the electronic data processing apparatus 100) where each service protocol plugin 110, 110' is configured to communicate with (at least) a particular one of the external service interfaces 120, 120'. A particular external service interface 120, 120' connects with (or is part of) at least one particular external service.

In some embodiments, one service protocol plugin 110, 110' connects with (or is part of) one specific external service. In other alternative or supplementary embodiments, a service protocol plugin 110, 110' can connect to a plurality of different external services (via respective external service interfaces 120, 120'). In yet other alternative or supplementary embodiments, a plurality of different service protocol plugins 110, 110' may connect to a same external service (via one or more external service interfaces). At least according to some embodiments, a service protocol plugin 110, 110' is specific to one external service (and thereby to one external service interface 120, 120'). An external service interface 120, 120' may e.g. be provided as part of an API (application programming interface) or the like by the party providing the relevant external service.

An external service is in the context of aspects of the present invention, a computer-implemented service, such as a computer program, application (app), etc., that is used by a user on and/or from at least one user device 200, 200' being associated with the user (where a given user device 200, 200' at least in some embodiments may be usable by or associated with more than one user). One, some, or all of the user devices is/are mobile data processing devices. The external services and the external service interfaces are denoted external since they are external to the electronic data processing apparatus 100.

The external service may be stored on and run by a particular user device 200, 200' fully or partly. If fully, the external service is stored and run locally on the particular user device 200, 200'. If partly, the external service comprises a server-side part and a client-side part where the server-side part resides and runs remotely, e.g. as part of a cloud computing solution, and the client-side part resides and runs locally on the particular user device 200, 200'. An external service interface 120, 120' may be stored locally or externally to a particular user device 200, 200'. What is significant is that an external service interface 120, 120' can be used by the electronic data processing apparatus 100 to communicate with a respective external service in order to obtain data as disclosed herein.

When the user uses an external service, data (where the content of the data depends on the particular external service) is generated and stored where at least a part of the generated data (or data derived therefrom) subsequently is retrieved and used by the electronic data processing apparatus 100 as disclosed herein and explained further in the following.

A single user device 200, 200' will typically store and run or at least access a number of different external services. An external service may also be installed on and be usable from several different user devices 200, 200' both for user devices associated with the same user and also for user devices associated with different users.

An external service may e.g. be a computer game, computer program, or other computer-implemented service. More particularly and according to the present invention, an external service is, as disclosed herein, a computer-implemented service, app, program, etc. According to certain aspects of the present invention, an external service may be either restricted or non-restricted. Certain external services usually of general use, e.g. an e-mail client, a browser, etc. may be exempted from designation of being either restricted or non-restricted.

A non-restricted external service according to aspects of the present invention is an external service where the use of the service by a user involves the user's competency according to certain criteria and furthermore where improvement of the user's competency, through use of the service, is quantifiable and furthermore where the external service is configured for communication with the electronic data processing apparatus 100 as disclosed herein. A competency may e.g. involve skill mastery, wit, physical activity, etc. Use of a single non-restricted external service may involve a plurality of different competencies for a user. General examples of such non-restricted external services are e.g. educational and/or creative computer games or apps, computer games or apps involving physical activity, etc. such as Duolingo (teaching languages), Quizlet (providing learning tools and learning games), artistic games or apps, math games or apps, fitness or other exercise games or apps, or similar. Non-restricted external services may e.g. be defined according to a white-list or similar e.g. provided or maintained centrally by the electronic data processing apparatus 100.

A restricted external service according to aspects of the present invention is in principle all other external services that are not non-restricted (except potentially exempted external services), i.e. external services that does not involve the user's competency and/or is not configured for communication with the electronic data processing apparatus 100 as disclosed herein (or is not on a white-list or similar). It is noted, that in principle a restricted external service may involve a user's competency in some form, but if it is not configured for communication with the electronic data processing apparatus 100 of data relating to a competency score as disclosed herein, it is still (at least in some embodiments) regarded as a restricted external service.

The electronic data processing apparatus 100 comprises a user device controller 150 configured to control access for a user to one or more external services, i.e. computer apps or programs, in accordance with a time allowance index (or overall score) for a particular user. The time allowance index is calculated or updated by a time index calculator 140 of the electronic data processing apparatus 100 as disclosed herein using weighted competency scores and e.g. as shown and explained in connection with FIG. 4 for at least some embodiments. A weighted competency score is commensurate or proportional to the time allowance it contributes with. An individual time allowance index is respectively associated with each relevant user. The time allowance index is updated regularly according to a predetermined schedule (that in some embodiments may be user-modifiable) e.g. daily. The user device controller 150 is configured for communication with one or more user devices and can both issue commands to the respective device(s) and receive data updates therefrom as disclosed herein.

Accordingly, use of the one or more (restricted) external services are restricted for a user by the user device controller 150 across all (one or more) user devices 200, 200'—even in case of running different operating systems—associated with the user. This enables more efficient utilization of network and/or computational resources and conserves network and/or computational bandwidth and furthermore tracks user activity across multiple devices e.g. running different operating systems. When the user uses any one of the restricted one or more external services, the time allowance index is reduced according to or proportionally to the time spent. If the time allowance index is reduced to zero (or another predetermined minimum value), it is not possible for the user to use or run any of the restricted one or more external services—at least not until the time allowance index has been increased again e.g. for the next day. Each user device 200, 200' (used according to aspects of the present invention as disclosed herein) comprises a status and control interface (see e.g. 240 in FIG. 2). The user device controller 150 communicates with the status and control interface or similar of each relevant user device to enable this.

The restricted one or more external services may e.g. be positively defined to be restricted external services. However, at least in some embodiments, the restricted one or more external services are determined to be (practically) all (except potentially exempted services) external services not forming part of a positively defined group (i.e. a white-list or similar) of external services being designated as non-restricted.

The time index calculator 140 calculates or updates the time allowance index for a particular user taking data obtained by the external service handler 130 via the service protocol plugin(s) 110, 110' into account, i.e. the data taken into account is obtained directly from the non-restricted external services as used by the particular user. At least in some embodiments (and e.g. as explained further in connection with FIG. 2), the time index calculator 140 calculates or updates the time allowance index for a particular user additionally taking data obtained from one or more user devices into account. This may data may e.g. be data representing physical activity of a user (or be data derived therefrom) provided by a user device. The user device may e.g. provide such data on its own (e.g. if the user device is a mobile phone or similar being able to measure physical activity) and/or by connecting with one or more external devices (see e.g. 220, 220' in FIG. 2) e.g. via an external device interface and one or more device protocol plug-ins (see e.g. 230 and 210, 210', respectively in FIG. 2). Alternatively or additionally, one or more external devices (see e.g. 220, 220' in FIG. 2) may provide the relevant data to an associated service that collects or aggregates the data instead of being collected by the respective user device. The electronic data processing apparatus 100 may then connect (e.g. via an external service interface 120, 120') to the associated service to obtain the data or data derived therefrom.

Figure 4:
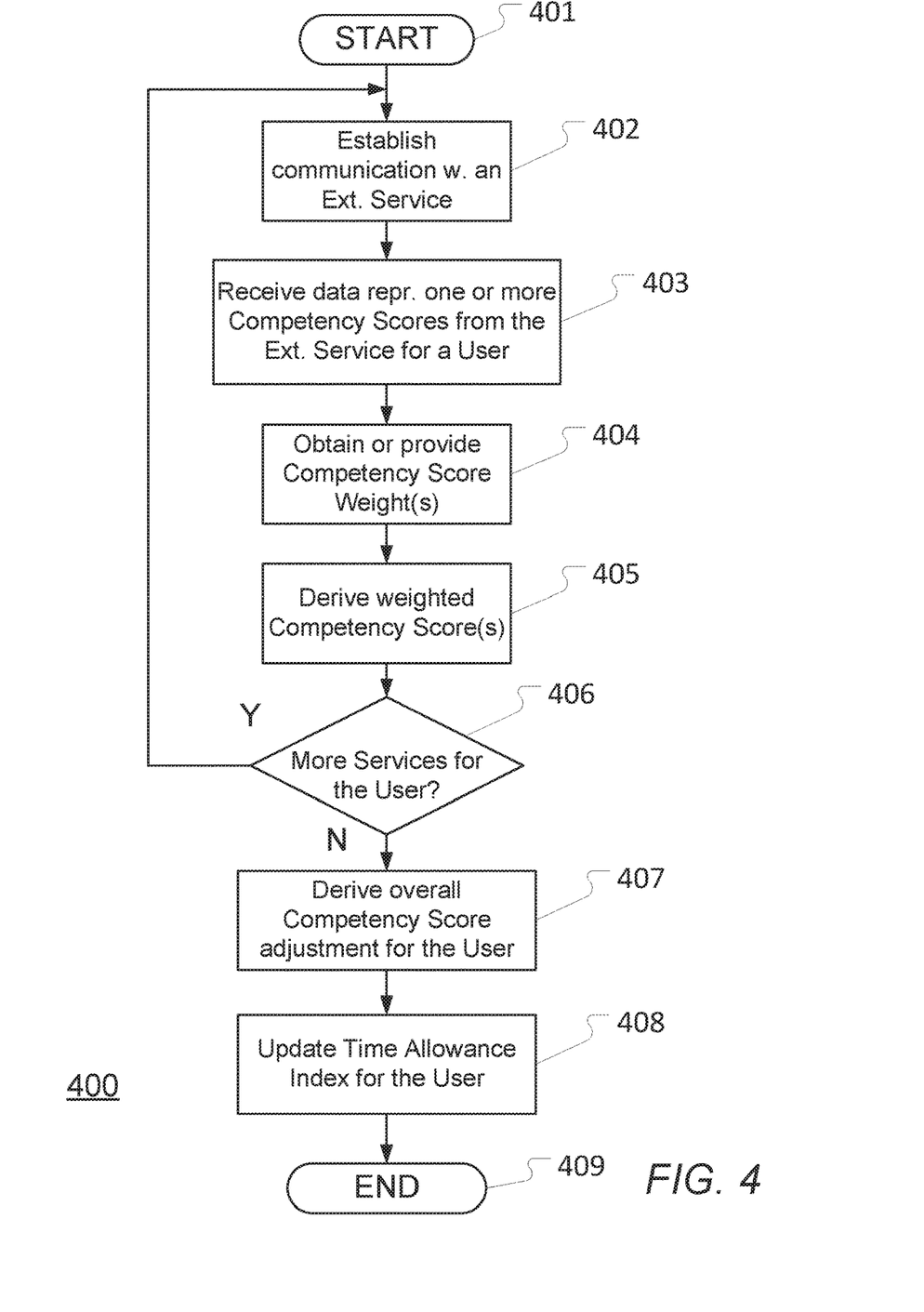
FIG. 4 schematically illustrates a flow chart of an embodiment of a computer-implemented method of updating a time allowance index for a user.

Embodiments and examples of how more specifically the data from different non-restricted external services is used in the calculation or update of the time allowance index by the time index calculator 140 is shown and explained e.g. in connection with FIG. 4.

As disclosed herein, the non-restricted external services relate to (approved) external services involving a user's quantifiable competency as represented by a competency score for each non-restricted external service where a competency score accurately reflects the user's competency of the particular non-restricted external service. Furthermore, the (weighted) competency score is commensurate or proportional with the amount of time allowance of restricted external services that it provides.

Accordingly, by requiring a user competency to be achieved, a 'gatekeeper' function or sort of time-limited "spigot" using competency is provided, and by calculating a proper time allowance, the user's competency improvement can be accelerated by encouraging more use of non-restricted external services through controlled time-limited uses of restricted external services. In this way, an iterative positive feedback system is provided, wherein as a user's competency in a skill being developed using a non-restricted external service increases, more time is allotted to use of restricted external services. This encourages the user to increase their competence by a non-restricted external service to accumulate more time for use with a restricted external service. As an example, using a language teaching app (a non-restricted external service) to complete a certain number of lessons, obtaining a minimum score or result, and/or the like allows a certain period of time for using e.g. a non-educational game (a restricted external service) where the certain period of time is commensurate or proportional with a quantifiable competency score as achieved by the user and not (necessarily at least) commensurate or proportional with the time use of the language teaching app.

In some embodiments, the service protocol plug-in(s) 110, 110', the external service handler 130, the time index calculator 140, and the user device controller 150 is implemented as part or layers of a (first) API e.g. running as a part of a cloud service.

In alternative embodiments, the functionality of the user device controller 150 is provided or is at least supplemented by communicating with a native OS interface (for each user device) as disclosed herein. In case of a plurality of user devices running different operating systems, a different native OS interface, at least in some embodiments, is provided—one for each different OS that is used or supported by the user devices. This enables cross- or multiplatform support in an expedient manner. A particular native OS interface may e.g. run on a particular user device or alternatively run centrally but then communicating with the particular user device (amongst a plurality of user devices running the same OS). Using a native OS interface also avoids the need of a dedicated program or application running on a user device as the functionality is implemented as part of the OS. In embodiments using at least one native OS interface, the electronic data processing apparatus 100 may be configured to exchange relevant data (both ways) for a particular user with the native OS interface. As one example, the electronic data processing apparatus 100 may simply provide a current or an updated time allowance index to the native OS interface that is then responsible to control the use by the user of restricted software services in accordance thereto as disclosed herein. The native OS interface may subsequently provide back a used part (i.e. the amount that the user has used) of the time allowance index to the electronic data processing apparatus 100 so it will have a current or updated value of the time allowance index. Instead of providing back a used part, an updated time allowance index can be provided instead (updated according to the use). Other exchange of information and data is also possible, e.g. as described in connection with FIG. 2. In some embodiments, the electronic data processing apparatus 100 may also provide a list or updated list of restricted software services that the user can use e.g. together with the provided time allowance index. In this way, the electronic data processing apparatus 100 communicates directly with the OS of the user device 200/200', or even communicates directly with several potentially different respective OS' of several user devices associated with the particular user the time allowance index is for.

FIG. 2 schematically illustrates a block diagram of an embodiment of a user device being under control by an electronic data processing apparatus such as the one shown in FIG. 1.

Illustrated in FIG. 2 are an electronic data processing apparatus 100, a user device 200/200', and one or more external services 500, 500' each comprising (or alternatively being connectible to) an external service interface 120, 120' as disclosed herein. The electronic data processing apparatus 100 and the external services interfaces 120, 120' may e.g. correspond to the respective ones shown and/or explained in connection with in FIG. 1.

The user device 200/200' comprises a control interface 240 that communicates with a user device controller (such as 150 in FIG. 1) or similar of the electronic data processing apparatus 100 as disclosed herein to restrict use of restricted external services 500, 500' according to a time allowance index. The control interface 240 may e.g. use a (current) white-list (and/or a black-list) to govern which restricted external services 500, 500' may (currently) be executed and which may not.

At least one of the one or more external services 500, 500' is a non-restricted external service and at least one of them is a restricted external service, as disclosed herein. At least the non-restricted external services comprise or are in connection with an external service interface 120, 120' (as it communicates with the electronic data processing apparatus 100 as disclosed herein). In some embodiments, at least some of the restricted external services may also comprise (or be in connection with) an external service interface 120, 120' but then e.g. for other purposes as it is not necessarily required (but still possible at least in some embodiments) for a restricted external service to communicate with an electronic data processing apparatus 100 as disclosed herein since the time usage of the restricted external services may be controlled by the control interface 240 (or its OS) of the user device 200/200'. It is noted, that at least in some embodiments, one or more non-restricted external service may not comprise or are not in connection with an external service interface 120, 120'. This may e.g. be the case if the non-restricted external service is whitelisted or similar but does not derive any data contributing to the time allowance index thereby not needing to communicate with the electronic data processing apparatus 100 as disclosed herein (but nevertheless is still allowed to be used).

As mentioned, the one or more external service 500, 500' may be running internally or externally (as shown) or as a combination thereof on the user device 200/200'. Different external services 500, 500' may run differently, e.g. one external service 500, 500' being run as a client/server (partly), one fully internally, etc.

Further illustrated are one or more optional external devices 220, 220' capable of measuring physical activity of a user and being configured to communicate with, and to provide data representing the measured physical activity to, the user device 200/200'. Examples of such optional external devices 220, 220' e.g. include fitness trackers, step-counters, smart-watches, etc. The user device 200/200' may e.g. be a mobile phone or similar and be able to measure physical activity directly. In some embodiments, the user device 200/200' comprises a standardized external device interface 230 and one or more device protocol plug-ins 210, 210' configured to interface the user device 200/200' with one or more external devices 220, 220' in order to retrieve data representing physical activity performed by a user. According to such embodiments, this data (or data derived therefrom) is transmitted by the user device 200/200' (and/or as mentioned later by an associated service of an external device 220, 220' that collects or aggregates data from it) to the electronic data processing apparatus 100 and can be used as a contributor towards the calculated or update time allowance index.

In this way, time usage towards restricted external services can be supplemented by also rewarding for physically based activities e.g. as measured by a user device and/or one or more external device being connected to (or at least communicating eventually with) the user device.

In at least some embodiments, a device protocol plug-in 210, 210' is specific to a certain (product or type of product) external device 220, 220'. Alternatively, or in addition, interfacing for a certain (product or type of product) external device 220, 220' is already built-in in the OS of the user device 200, 200' and the plug-in is not required. In such situations, the user device 200, 200' can provide the relevant data to the electronic data processing apparatus 100. Alternatively or additionally, one or more external devices 220, 220' may provide the relevant data to an associated service that collects or aggregates the data where the electronic data processing apparatus 100 then may connect (e.g. via an external service interface 120, 120') to the associated service to obtain the data or data derived therefrom. One example may e.g. be an external device being a smart watch and the associated service may e.g. be a data collection service of the provider of the smart watch.

In some embodiments, the device protocol plug-in(s) 210, 210', the external device interface 230, and the control interface 240 is implemented as part or layers of a (second) API. As mentioned, the present invention may work with user devices 200/200' running different operating systems, i.e. is cross- or multiplatform, by having these elements (210, 210', 230, and 240) implemented for the respective operating system of each user device 200/200'.

In some embodiments as disclosed in the entire specification, the device protocol plug-in(s) 210, 210', the external device interface 230, and the control interface 240 is implemented as a program on a particular user device 200/200'. In alternative embodiments (or a combination thereof), these elements 210, 210', 230, and 240 or elements corresponding in functionality thereto is implemented as part of the operating system (OS), i.e. a native OS interface and functionality is embedded as part of the OS. An OS provider can then specify their own user interface towards the user and the user device side functionality according to aspects of the present invention and furthermore choose to add their own additional features. So, instead of the electronic data processing apparatus 100 then communicating with an installed software implementation of the elements 210, 210', 230, and 240 as disclosed herein, the electronic data processing apparatus 100 will communicate directly with the OS on the user device 200/200'. An OS provider may e.g. provide one or more of: user device activity (e.g. including time allowance spent from the time allowance index since last update, time spent with white list software services, etc.); user access status; user administration; whitelist administration; schedule administration; time allowance administration; etc. via the native OS interface.

An OS provider may e.g. request and obtain one or more of: user allowance status (e.g. including remaining time allowance index, value of the time allowance index, etc.); user access status (e.g. including full access (except blacklisted software services), only whitelist software services allowed; blocked (only allowing critical predetermined software services; etc.); current user time schedule; list of whitelist software services; identification of the critical predetermined software services allowed in blocked mode; etc. via the native OS interface.

Figure 3:
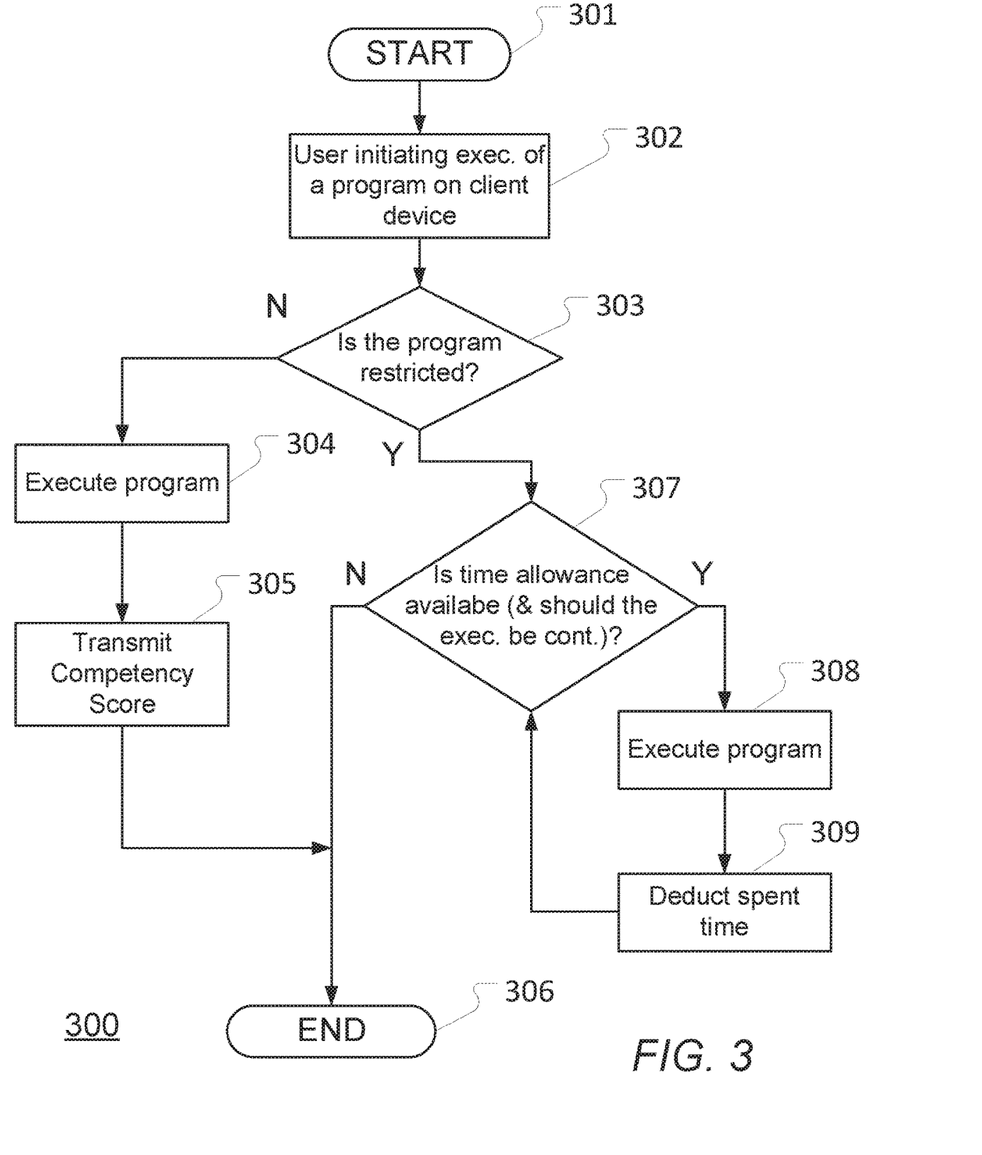
FIG. 3 schematically illustrates a flow chart of an embodiment of a computer-implemented method of efficiently utilizing network resources and conserving network bandwidth.

FIG. 3 schematically illustrates a flow chart of an embodiment of a computer-implemented method of efficiently utilizing network resources and conserving network bandwidth.

Figure 5:
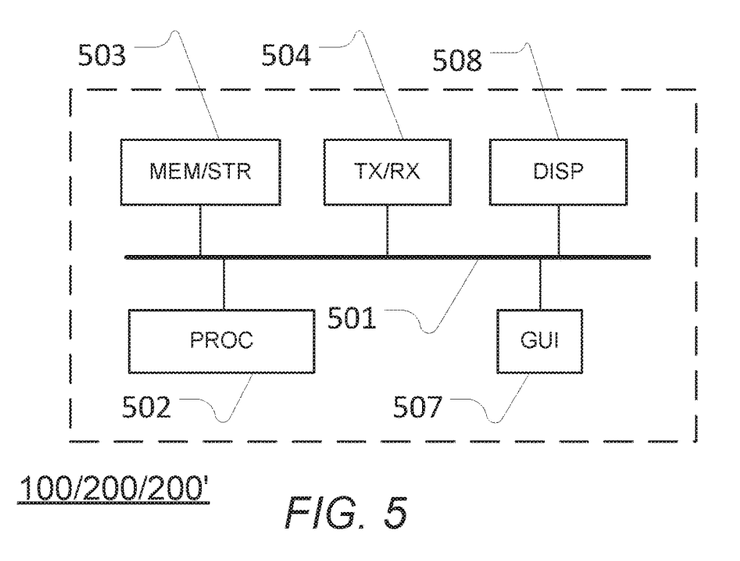
FIG. 5 schematically illustrates a functional block diagram of embodiments of an electronic data processing apparatus configured to efficiently utilize network resources and to conserve network bandwidth and/or implementing various embodiments of the methods as disclosed herein.

Illustrated in FIG. 3 is a flow chart of an embodiment of a computer-implemented method 300 of efficiently utilizing network resources and conserving network bandwidth where the computer-implemented method is performed by an electronic data processing apparatus and a user device, e.g. or preferably such as the ones illustrated as 100 and 200/200', respectively, in FIGS. 1, 2, and 5.

At step 301, the method starts and potentially is initialized, etc. In some embodiments, step 301 may e.g. comprise receiving or updating a whitelist (and/or a blacklist) of software services that can (and can't) be executed—at least for the time.

At step 302, execution of a computer program, i.e. an external service (see e.g. 500, 500' in FIG. 2) is initiated by a user operating a user device (see e.g. 200, 200' in FIGS. 1, 2, and 5).

At step 303, it is checked whether the program in question is a restricted external service. In case of no, i.e. the external service is non-restricted (or potentially exempted), the method proceeds to step 304 where the program is executed as normal. The program may be stored on and run by a particular user device fully or partly as disclosed herein. Step 303 may comprise or involve checking against a whitelist (and/or a blacklist) of software services as disclosed herein. Alternatively, the check can replaced by the OS initially checking whether a software service is allowed to run or not (e.g. at step 301 or even earlier) e.g. checking against a whitelist.

After (or alternatively during) execution, data representing one or more competency scores reflecting and representing an improvement of the user's competency using the external service is/are obtained at step 305 and transmitted as disclosed herein to an electronic data processing apparatus (see e.g. 100 in FIGS. 1, 2, and 5) via an external service interface (see e.g. 120, 120' in FIGS. 1 and 2) of the external service in question. In particular, the one or more competency scores is used to update the time allowance index as disclosed herein.

Alternatively, the data representing the one or more competency scores is stored, e.g. on the user device and/or in connection with the external service, and not transmitted to the electronic data processing apparatus until a later time, e.g. upon request by the electronic data processing apparatus, according to a predetermined schedule, etc.

As already mentioned, some non-restricted external services may not provide any competency score nor be related to competency of the user but be non-restricted none the less, i.e. be exempted. This may e.g. be the case for more generic programs that is not normally (but can be depending on implementation) to be restricted, such as an e-mail client, perhaps browser, phone application, video conversation application etc. For such exempted external services, step 305 is simply not carried out/not needed.

After step 305, the method proceeds to step 306 where the method ends (where the method 300 typically is started again a next time a user initiates execution of a program).

If the result of the check at step 303 is yes, i.e. the external service is restricted, the method proceeds from step 303 to step 307 instead of to step 304. At step 307, it is checked whether the time allowance index for the particular user allows for any time to be used for the restricted external service (and for subsequent loops of steps 307, 308, and 309 whether execution of the program should be continued). In case of yes (to both conditions), the method proceeds to step 308 where the program is executed at least for a certain amount of time not exceeding the time allowance index (and depending on specific implementation and/or on what minimum unit the time allowance index is used according to, e.g. 1 minute, 1 second, 10 or 15 seconds, etc.). After the program has been executed for the certain amount of time, the method proceeds to step 309 where the certain amount of time the restricted external service has been running or used is deducted from the time allowance index as that time now has been used and the method loops back to step 307 to check whether there is still time left according to the time allowance index and whether the users wishes to continue executing the program. Alternatively, the time allowance index is reduced in a non-linear way as disclosed herein, i.e. not simply being deducted according to time spent but e.g. a function thereof—e.g. reducing the time allowance index in an accelerating manner, etc.

It should be noted, in practicality, the looping of steps 307→308→309 will not interrupt the execution of the program; at least not in way as perceivable by the user. Furthermore, the check at step 307 of whether the user wishes to continue executing the program does generally not involve that the user is actually being prompted or similar to whether that is the case or not but rather that this is assumed unless the user has done something indicating otherwise, e.g. by quitting the program, etc.

By restricting the use of programs according to this method for restricted external services, network resources and network bandwidth (and/or computational resources and bandwidth) is reduced and conserved.

The looping of steps 307, 308, and 309 may also be implemented differently while obtaining more or less the same effect. For example, a timer could be set to an amount being equal to the current maximum time allowance that can be used and the program then be executed until the maximum time is used or the user stops execution in another way after which the used amount of time is deducted from the time allowance index. The user may be prompted intermittently underway of remaining time left. A functionality corresponding to the flow chart of FIG. 3 may also be provided in alternative ways, e.g. in an asynchronous way.

The check of step 307 may at least in some embodiments also include additional check(s) and/or condition(s). As an example, it may be specified that restricted external services may only be run during certain time slots.

It is to be noted, that the user may interrupt execution of a program at any time they wish as normal after which the amount of time used so far for execution is deducted from the time allowance index in case of restricted external service before ending the method at step 306.

When or before ending the method 300 at step 306, the time allowance index (updated according to used time of execution of a restricted program) is communicated to the electronic data processing apparatus and at least according to some embodiments to a user device controller (see e.g. 150 in FIG. 1) or similar of the electronic data processing apparatus. Alternatively, the updated time allowance index is stored on the user device and communicated to the electronic data processing apparatus at a later time, e.g. according to a predetermined schedule.

This may also be done prior to execution of the method 300, e.g. daily or according to another predetermined schedule or upon request.

At least in some embodiments, step 301 (or another suitable step) receives or makes sure that the time allowance index for the particular user in question is updated e.g. by communicating with the electronic data processing apparatus.

The method 300 may be run on a single user device for more than one user. In such case, one instance of the method 300 is run for each user using (and updating) the respective user's time allowance index.

The method 300 may also be run on several user devices for a single user. In such case, one instance of the method 300 is run on each user device for the user using (and updating) the user's time allowance index. Information about the time allowance index as it is updated is then shared between relevant user devices. This may e.g. be done by communicating any updated time allowance index for a given user to the electronic data processing apparatus, i.e. centrally, thereby facilitating that the time allowance index for the given user is always updated even if the user users more than one user device since another user device may simply receive the updated time allowance index on that user device if the user switches to another user device. Alternatively, other ways of synchronizing the time allowance index may be used.

The method 300 may at least in some embodiments also be paused—e.g. by the user switching (temporarily) to execution of another program on the user device—and later resumed as normal.

The steps of the method 300 are executed by the user device, at least in some embodiments, by or under the control of a status and control interface (see e.g. 240 in FIG. 2)—depending on specific implementation—in communication with the electronic data processing apparatus and/or one or more external services. Alternatively, the steps of the method 300 are executed in part or fully under the control of the OS of the user device communicating with the electronic data processing apparatus via a native OS interface as disclosed herein.

As yet another alternative embodiment of a computer-implemented method of efficiently utilizing network resources and conserving network bandwidth (i.e. corresponding to effect to the method 300 of shown in FIG. 3 and explained above, a status or flag may e.g. be set (e.g. by a user action or other) that the user is initiating use of the time allowance index. Prior to this, the user device will have a given whitelist of software services (non-restricted and exempted) that the user device is able to execute. Upon that status or flag being set, the user device contacts the electronic data processing apparatus to receive an updated whitelist—now also containing restricted software services—thereby being able to run 'all' software services. At the same time, the time allowance index is begun to be used or consumed. This continues until the time allowance index is spent or consumed fully (or the a certain minimum threshold) or until a status or flag is set (e.g. by a user action or other) that the user stopping use of the time allowance index. When this happens, the user device contacts the electronic data processing apparatus to receive an updated whitelist—now again only containing non-restricted and exempted software services—hindering execution of restricted software services and updating (now or later) the time allowance index for the user of the user device according to the used or consumed amount.

The whitelists may also be regarded as a configuration for the user device that determines what software services the user device (currently) is able to execute.

FIG. 4 schematically illustrates a flow chart of an embodiment of a computer-implemented method of updating a time allowance index for a user.

Illustrated in FIG. 4 is a flow chart of an embodiment of a computer-implemented method 400 of updating a time allowance index for a user where the computer-implemented method is performed by an electronic data processing apparatus, e.g. or preferably such as ones illustrated as 100 in FIGS. 1, 2, and 5.

At step 401, the method starts and potentially is initialized, etc.

At step 402, the electronic data processing apparatus establishes communication with a non-restricted external service (see e.g. 500, 500' in FIG. 2). More specifically, the electronic data processing apparatus establishes communication with an external service interfaces (see e.g. 120, 120' in FIGS. 1 and 2) of a non-restricted external service as disclosed herein.

At step 403, data representing one or more competency scores for the external service for a particular user (or alternatively for a plurality of users) is obtained.

At step 404, a competency score weight is provided or obtained for each competency score and at step 405, the relevant weight is applied to the relevant competency score resulting in one or more weighted competency scores.

As an example, if the external service is a language teaching app or program then the retrieved data representing a competency score could e.g. represent number of completed language exercises and the appropriate weight could e.g. be 1. If, as an example, 7 exercises were completed by the user then the derived weighted competency score would be 7 (7 times 1).

As another example, if the external service is a book reading service then the retrieved data representing a competency score could e.g. represent a number of pages read with an appropriate weight factor e.g. being 5. If, as an example, 2 pages have been read by the user then the derived weighted competency score of would be 10 (2 times 5).

As yet another example, if the external service is a step-counter service then the retrieved data representing a competency score could e.g. represent a number of steps taken by the user with an appropriate weight factor e.g. being 0.008. If, as an example, 2.500 steps have been taken by the user then the derived weighted competency score of would be 20 (2.500 times 0.008).

As mentioned, a weighted competency score is commensurate or proportional to the time allowance it contributes with in relation to the time allowance index of the user.

Applying weights in this way normalizes the contribution of different competency scores from potentially very different types of external services (e.g. reading pages of an electronic book, walking or running a number of steps, etc.). Weights may also be different even for external services of a same type, e.g. one math app may be associated with a certain weight while another math app may be associated with a different weight, e.g. due to difference in complexity. Applying weights also provides or enables a fair contribution regardless of the type of external service. Some users may prefer certain types of external services than other users.

In at least some embodiments, the weight(s) are set by the electronic data processing apparatus according to predetermined rules.

As disclosed herein, the weights applied to the competency score can be static or dynamic.

In some but not necessarily all embodiments, the weights may be different according to the age of the user, e.g. being greater for younger users.

At step 406 it is checked whether one or more competency scores should be retrieved for further non-restricted external services. If yes, the method loops back to step 402 thus deriving one or more weighted competency scores for an additional external service. If no, the method proceeds to step 407 where an overall competency score for the user is derived taking the derived weighted competency scores into account, e.g. simply summing them or alternatively using another functional relationship.

At step 408, the time allowance index for the user is updated (or calculated) according to the overall competency score adjustment. In at least some embodiments, the time allowance index is simply added with the derived overall competency score adjustment. Alternatively, another functional relationship is used to update the time allowance index according to the derived overall competency score adjustment.

In some embodiments, the time allowance index for a given user is further updated taking data representing physical activity performed by the user into account, e.g. by obtaining such data via one or more user devices from one or more external devices (see e.g. 200, 200' and 220, 220', respectively in FIG. 2) as disclosed herein. This may e.g. be done at step 408 or 407. Alternatively, this may be done at another time and/or separately.

The updated time allowance index is then stored at or in connection with the electronic data processing apparatus for communication with a number of user devices for the relevant user after which the method ends at step 409. The time allowance index will be updated (e.g. upon request and/or according to a predetermined schedule) again by the user using time with a restricted external service and/or by the user using further time with a non-restricted external service.

The method 400 may e.g. be initiating upon request and/or according to a predetermined schedule.

It should be noted, that steps 402 to 405 e.g. may alternatively be done for more than one external service at a time. Alternatively or in addition, steps 402-408 may be done for more than one user at a time.

Alternatively, step 407 may also be carried out as part of the loop of steps 402 to 406.

Alternatively, step 404 may e.g. be done prior to step 403.

FIG. 5 schematically illustrates a functional block diagram of embodiments of an electronic data processing apparatus configured to efficiently utilize network resources and to conserve network bandwidth and/or implementing various embodiments of the methods as disclosed herein.

Shown is an electronic data processing apparatus 100 comprising one or more processing units 502 connected via one or more communications and/or data buses 501 to an electronic memory and/or electronic storage 503, and one or more signal transmitter and receiver communications elements 504 (e.g. one or more of cellular, Bluetooth, WiFi, etc.) for communicating via a computer network, the Internet, and/or the like.

The functional block diagram of FIG. 5 can equally apply to a user device 200/200'.

The electronic data processing apparatus 100 and/or user device 200/200' may also comprise an optional display 508 and/or one or more optional user interface elements 507. A user device as disclosed herein will often comprise a display 508 and one or more user interface elements 507 but an electronic data processing apparatus as disclosed herein may, at least not in some embodiments, not.

The electronic data processing apparatus 100 and/or user device 200/200' can e.g. be one or more programmed computational devices, e.g. like a PC, laptop, computer, server, smart-phone, tablet, etc. and is specially programmed to carry out or execute the computer-implemented method(s) and embodiments thereof as described throughout the specification and variations thereof.

Some preferred embodiments have been shown in the foregoing, but it should be stressed that the invention is not limited to these, but may be embodied in other ways within the subject matter defined in the following claims.

In the claims enumerating several features, some or all of these features may be embodied by one and the same element, component or item. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, elements, steps or components but does not preclude the presence or addition of one or more other features, elements, steps, components or groups thereof.

The invention claimed is:

1. A computer-implemented method to implement efficient utilization of network resources by an electronic data processing system to conserve network bandwidth consumed by user computing devices over a computer network by managing access to restricted and non-restricted software services, the method comprising the steps of:
    operatively connecting the electronic data processing system to a first of the non-restricted software services via a first application programming interface (API);
    receiving, via the first API, a first topic indicative of an improvement in or a type of competency by a human user of a first of the user computing devices on which the first non-restricted software service is at least partly deployed, the first non-restricted software service having an electronic interface with which the human user interacts using the first of the user computing devices to attain or improve the competency of the human user;
    calculating, by the electronic data processing system, a weighted competency score based on a quantity corresponding to or representing the first topic and a weight configured to normalize the quantity relative to other non-restricted software services;
    updating, by a time index calculator, a first time allowance index using the calculated weighted competency score, the first time allowance index representing a time period during which a time-limited access to a first of the restricted software services is granted by the electronic data processing system;
    operatively connecting the electronic data processing system to a first of the restricted software services via a second API;
    granting access by the electronic data processing system to the first of the restricted software services by connecting the first of the restricted software services to the first or an other of the user computing devices operated by the human user responsive to validating that the human user is operating the first or the other of the user computing devices while decreasing the first time allowance index as the first of the restricted software services is connected to the first or the other of the user computing devices; and
    responsive to the time period expiring or reaching an expiration threshold, terminating or denying by the electronic data processing system the access to all of the restricted software services.

2. The method of claim 1, the calculating the weighted competency score being further based on an age of the human user such that different weights are applied for the same topic according to different ages or age ranges of the human user.

3. The method of claim 2, wherein the weight is dynamically adjusted based on a statistical correlation between a rate of improvement of the competency and the age or age range of the human user such that the weight associated with the human user for the topic is lower compared to a corresponding weight of an other human user for the same topic having the same age or within the same age range as the human user and having a lower rate of improvement of the competency.

4. The method of claim 1, further comprising:
    causing to be displayed on one or more video display devices a plurality of time allowance indexes including the first time allowance index associated with human users on the computer network according to a sorting order;
    dynamically adjusting the sorting order as the time allowance indexes change.

5. The method of claim 1, wherein the weight is automatically assigned according to a function that includes how much an activity or effort by the human user expended produces a commensurate improvement in the competency such that a lower weight is applied to a low-level activity or effort that produces a relatively high improvement in the competency whereas a higher weight is applied to a high-level activity or effort that produces a relatively low improvement in the competency.

6. The method of claim 1, further comprising automatically changing the weight to incentivize a qualitative enhancement in a subsequent pursuit of the activity or a different activity in exchange for an adjustment in the time allowance index by examining historical weights applied to accumulated competency scores by the human user to determine which of the historical weights are correlated with available ones of the non-restricted software services and at least one competency objective applied by an administrator user of the electronic data processing system.

7. The method of claim 1, further comprising dynamically adjusting the weight by the electronic data processing system based on a historical accumulation of the first time allowance index correlated to the topic relative to other topics associated with other non-restricted software services such that a lower historical accumulation causes the weight to be raised so that the weight has a higher impact on the first time allowance index for subsequent uses of the first of the non-restricted software services.

8. The method of claim 1, further comprising:
    while the first human user is accessing the first of the non-restricted software services using the first or the other of the user computing devices, receiving an input from the first or the other of the user computing devices indicative of a request to add more time to the first time allowance index;
    responsive to receiving the request to add an amount of added time, transferring time accrued in a second time allowance index to the first time allowance index to grant the first human user additional time corresponding to the added time to continue to access the first of the non-restricted software services for an additional amount of time corresponding to or commensurate with the added time from the second time allowance index.

9. The method of claim 8, further comprising:
    responsive to the transferring time from the second time allowance index to the first time allowance index, adding value from the first time allowance index accrued by the first human user as the first human user accesses an associated one of the restricted software services using the first or the other of the user computing devices to the second time allowance index until the added time has been restored to the second time allowance index.

10. The method of claim 1, further comprising storing the time allowance index as a block in a blockchain having an associated distributed ledger such that accrued time in a time allowance index in the blockchain is configured to be exchanged with other human users of the computer network operating other ones of the user computing devices and exchanges of accrued time among human users of the computer network transacted on the blockchain are reflected in the distributed ledger.

11. The method of claim 10, further comprising:
tracking an exchange of accrued time from the time allowance index transacted on the blockchain to a second time allowance index on the blockchain associated with a second human user on the computer network and updating the distributed ledger to reflect the exchange;
responsive to the exchange and responsive to the second human user incrementing the second time allowance index, transferring accumulated time in the second time allowance index to the time allowance index associated with the first human user until the exchange of accrued time can be settled;
updating the distributed ledger to reflect the transfer of the accumulated time from the second time allowance index to the first time allowance index.

12. The method of claim 11, further comprising dynamically reducing at least one weight used to calculate a weighted competency score associated with at least an associated one of the restricted software services accessed by the second human user until the exchange of accrued time has been settled on the distributed ledger.

13. The method of claim 1, wherein the decreasing the first time allowance index has a variable rate.

14. The method of claim 13, wherein the decreasing the first time allowance accelerates as uninterrupted consumption of bandwidth on the computer network using the first of the restricted software services increases.

15. The method of claim 1, further comprising:
tracking a competency-based component in the first of the restricted software services while the human user is operating the first or the other of the user computing devices via the second API;
receiving, via the second API, a second topic indicative of an improvement in or a type of competency in the competency-based component by the human user of the first or the other of the user computing devices;
calculating, by the electronic data processing system, a second weighted competency score based on a quantity corresponding to or representing the second topic and a second weight;
adjusting, by the time index calculator, the first time allowance index using the second calculated weighted competency score so as to extend the time the human user is granted access to the first of the restricted software services.

16. The method of claim 15, wherein the adjusting the first time allowance index using the second calculated weighted competency score includes slowing a rate that the first time allowance index is decreased.

17. The method of claim 1, further comprising:
receiving a second topic indicative of an improvement in or a type of competency by the human user using a second of the non-restricted software services;
calculating, by the electronic data processing system, a second weighted competency score based on a quantity corresponding to or representing the second topic and a corresponding weight configured to normalize the quantity relative to other non-restricted software services;
updating, by the time index calculator, a second time allowance index using the second calculated weighted competency score, the second time allowance index representing a time period during which a time-limited access to any selected one of the restricted software services is granted by the electronic data processing system;
operatively connecting the electronic data processing system to the selected one of the restricted software services;
granting access by the electronic data processing system to the selected one of the restricted software services by connecting the selected one of the restricted software services to a user computing device operated by a second human user while decreasing the second time allowance index.

18. The method of claim 1, wherein the second API is implemented as part a native OS interface.

19. The method according to claim 1, wherein
operatively connecting the electronic data processing system to a first of the restricted software services via a second API;
granting access by the electronic data processing system to the first of the restricted software services; and
terminating or denying by the electronic data processing system the access to all of the restricted software services,
is implemented as part of a native OS interface.

20. An electronic data processing system, comprising:
one or more processing devices connected to an electronic memory, and
one or more signal transmitter and receiver communications devices for communicating via a computer network,
wherein the one or more processing devices are programmed and configured to execute a computer-implemented method to implement efficient utilization of network resources by the electronic data processing system to conserve network bandwidth consumed by user computing devices over the computer network by managing access to restricted and non-restricted software services, the method comprising the steps of:
operatively connecting the electronic data processing system to a first of the non-restricted software services via a first application programming interface (API);
receiving, via the first API, a first topic indicative of an improvement in or a type of competency by a human user of a first of the user computing devices on which the first non-restricted software service is at least partly deployed, the first non-restricted software service having an electronic interface with which the human user interacts using the first of the user computing devices to attain or improve the competency of the human user;
calculating, by the electronic data processing system, a weighted competency score based on a quantity corresponding to or representing the first topic and a weight configured to normalize the quantity relative to other non-restricted software services;
updating, by a time index calculator, a first time allowance index using the calculated weighted competency score, the first time allowance index representing a time period during which a time-limited access to a first of the restricted software services is granted by the electronic data processing system;
operatively connecting the electronic data processing system to a first of the restricted software services via a second API;
granting access by the electronic data processing system to the first of the restricted software services by connecting the first of the restricted software services to the first or an other of the user computing devices operated by the human user responsive to validating that the human user is operating the first or the other of the user computing devices while decreasing the first time allowance index as the first of the restricted software services is connected to the first or the other of the user computing devices; and responsive to the time period expiring or reaching an expiration threshold, terminating or denying by the electronic data processing system the access to all of the restricted software services.

\* \* \* \* \*